United States Patent
Miyamura et al.

(10) Patent No.: US 10,453,485 B1
(45) Date of Patent: Oct. 22, 2019

(54) INCREASING DATA STORAGE CAPACITY BY REDUCING INDEX ENTRIES

(71) Applicant: International Business Machines Corporation, Armonk, NY (US)

(72) Inventors: Tsuyoshi Miyamura, Yokohama (JP); Hiroshi Itagaki, Yokohama (JP); Tohru Hasegawa, Tokyo (JP); Noriko Yamamoto, Tokyo (JP); Shinsuke Mitsuma, Higashimurayama (JP); Sosuke Matsui, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,391

(22) Filed: Nov. 26, 2018

(51) Int. Cl.
*G11B 15/00* (2006.01)
*G11B 15/43* (2006.01)
*G11B 5/55* (2006.01)
*G06F 3/06* (2006.01)
*G11B 20/12* (2006.01)

(52) U.S. Cl.
CPC .......... *G11B 5/5504* (2013.01); *G06F 3/0619* (2013.01); *G06F 3/0629* (2013.01); *G06F 3/0643* (2013.01); *G06F 3/0682* (2013.01); *G11B 20/1201* (2013.01)

(58) Field of Classification Search
CPC ....... G11B 20/12; G11B 15/005; G11B 15/46; G11B 15/43; G11B 5/54; G11B 5/59633; G11B 5/59638; G11B 5/588
USPC .......... 360/48, 72.1, 73.04, 74.03, 75, 77.12
See application file for complete search history.

(56) References Cited

U.S. PATENT DOCUMENTS

| | | | |
|---|---|---|---|
| 8,035,912 B2 * | 10/2011 | Katagiri | G11B 15/473 360/73.04 |
| 9,851,927 B2 | 12/2017 | Hasegawa et al. | |
| 2015/0161161 A1 | 6/2015 | Iwanaga et al. | |
| 2016/0098221 A1 | 4/2016 | Klein et al. | |
| 2018/0165292 A1 | 6/2018 | Abe et al. | |

* cited by examiner

*Primary Examiner* — Nabil Z Hindi
(74) *Attorney, Agent, or Firm* — Zilka-Kotab, P.C.

(57) ABSTRACT

A tape method, according to one embodiment, includes: adjusting a position of a tape head in the tape drive relative to a magnetic tape such that the tape head is positioned at an accumulating backhitchless flush (ABF) wrap on the magnetic tape. A first index is also written in the ABF wrap. The first index corresponds to data written in a data partition on the magnetic tape, and the ABF wrap and the data partition are different partitions. Furthermore, in response to writing the first index in the ABF wrap, the position of the tape head is adjusted relative to the magnetic tape such that the tape head is positioned at the data partition. A first empty index is also appended to an end of the data written in the data partition, where a size of the first empty index is less than a size of the first index.

20 Claims, 17 Drawing Sheets

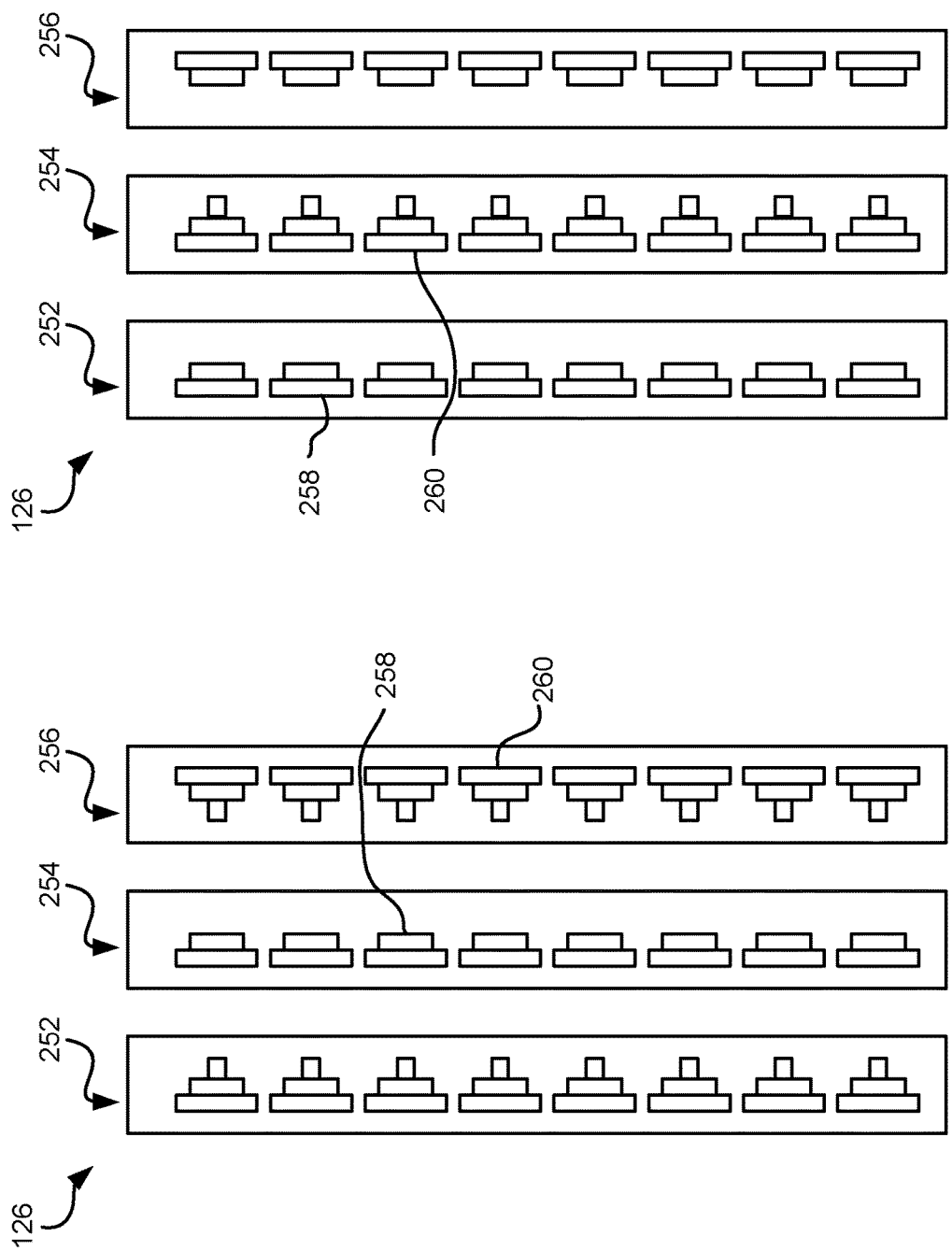

INCREASING DATA STORAGE CAPACITY BY REDUCING INDEX ENTRIES

BACKGROUND

The present invention relates to data storage systems, and more particularly, this invention relates to increasing the storage capacity of magnetic tapes by reducing index entries.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems. Thus, attempts to further increase the storage capacity of magnetic tapes have also involved adjusting what information is actually stored on the medium itself.

SUMMARY

A tape drive-implemented method, according to one embodiment, includes: in response to detecting a first lapse of a predetermined amount of time, adjusting a position of a tape head in the tape drive relative to a magnetic tape such that the tape head is positioned at an accumulating backhitchless flush (ABF) wrap on the magnetic tape. A first index is also written in the ABF wrap. The first index corresponds to data written in a data partition on the magnetic tape, and the ABF wrap and the data partition are different partitions. Furthermore, in response to writing the first index in the ABF wrap, the position of the tape head is adjusted relative to the magnetic tape such that the tape head is positioned at the data partition. A first empty index is also appended to an end of the data written in the data partition, where a size of the first empty index is less than a size of the first index.

A computer program product, according to another embodiment, includes a computer readable storage medium having program instructions embodied therewith. Moreover, the program instructions are readable and/or executable by a processor to cause the processor to: perform the foregoing method.

A system, according to yet another embodiment, includes: a tape drive, a processor, and logic integrated with the processor, executable by the processor, or integrated with and executable by the processor. Moreover, the logic is configured to: perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a tape drive-implemented method includes: in response to detecting a first lapse of a predetermined amount of time, adjusting a position of a tape head in the tape drive relative to a magnetic tape such that the tape head is positioned at an accumulating backhitchless flush (ABF) wrap on the magnetic tape. A first index is also written in the ABF wrap. The first index corresponds to data written in a data partition on the magnetic tape, and the ABF wrap and the data partition are different partitions. Furthermore, in response to writing the first index in the ABF wrap, the position of the tape head is adjusted relative to the magnetic tape such that the tape head is positioned at the data partition. A first empty index is also appended to an end of the data written in the data partition, where a size of the first empty index is less than a size of the first index.

In another general embodiment, a computer program product includes a computer readable storage medium having program instructions embodied therewith. Moreover, the program instructions are readable and/or executable by a processor to cause the processor to: perform the foregoing method.

In yet another general embodiment, a system includes: a tape drive, a processor, and logic integrated with the processor, executable by the processor, or integrated with and executable by the processor. Moreover, the logic is configured to: perform the foregoing method.

Figure 1A:
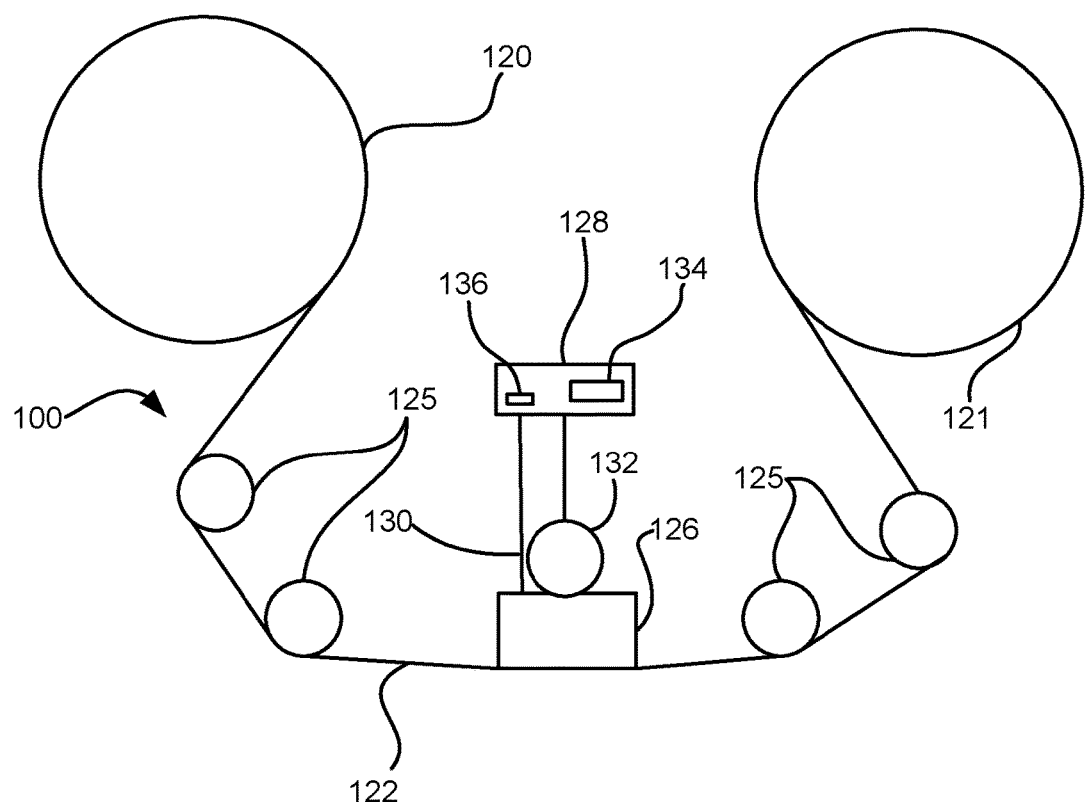
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
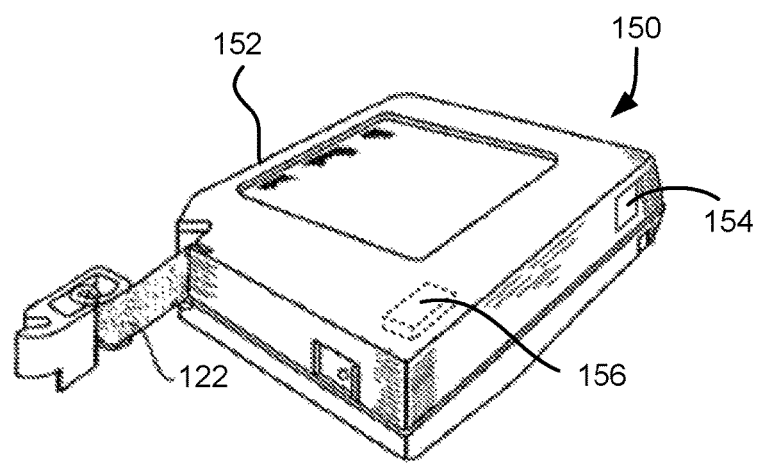
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
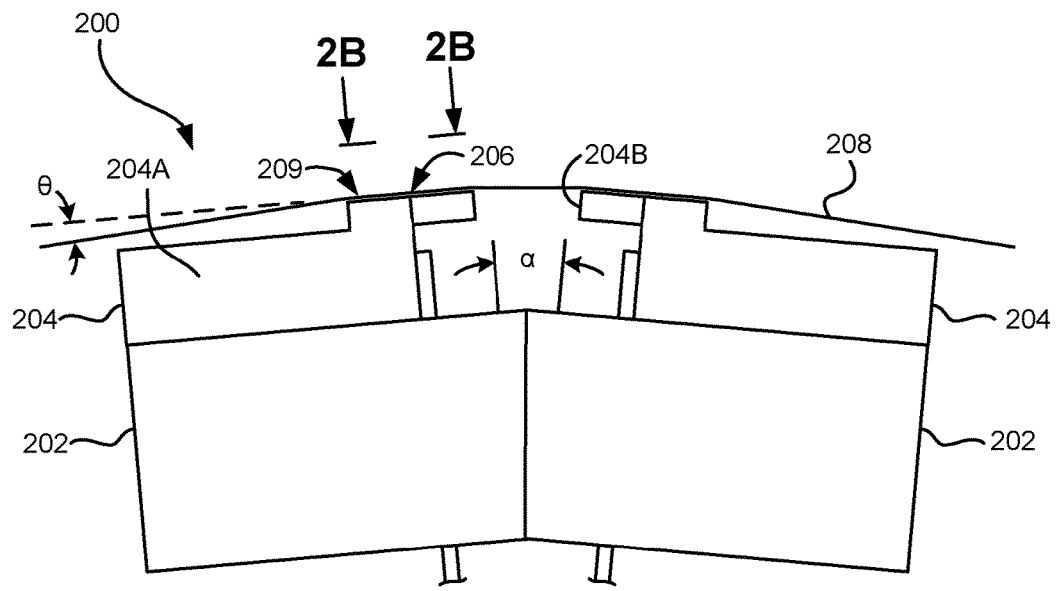
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
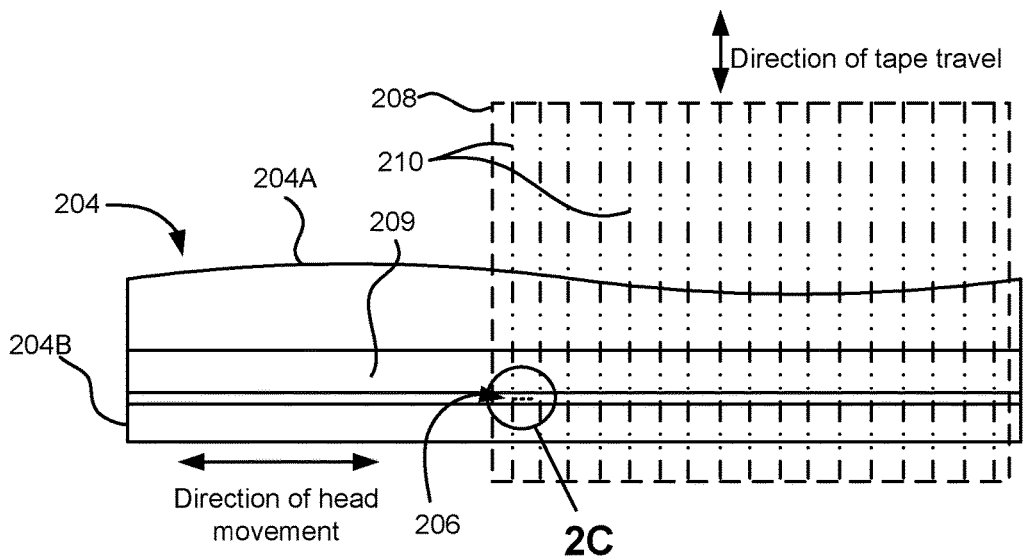
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
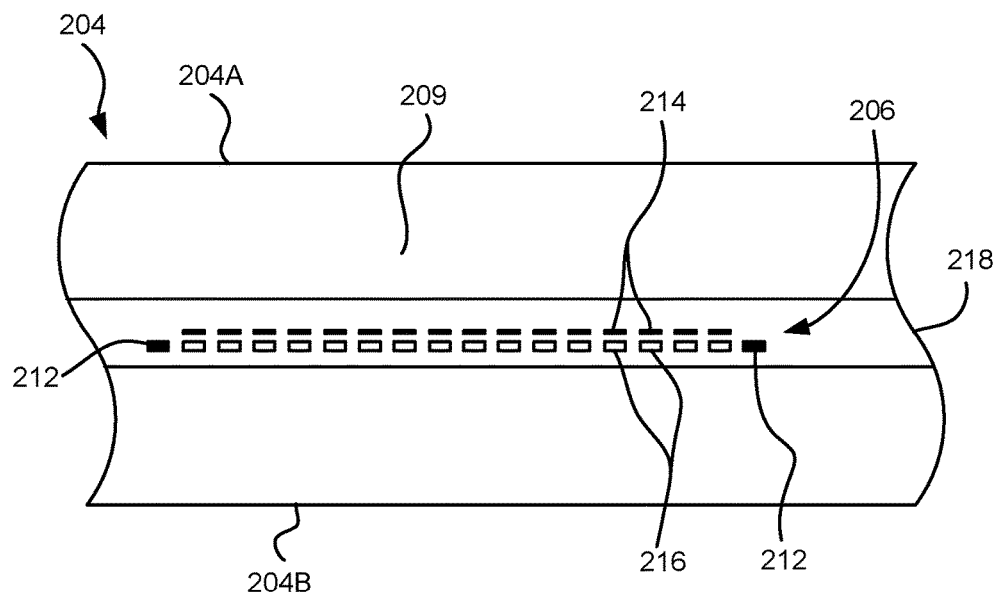
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
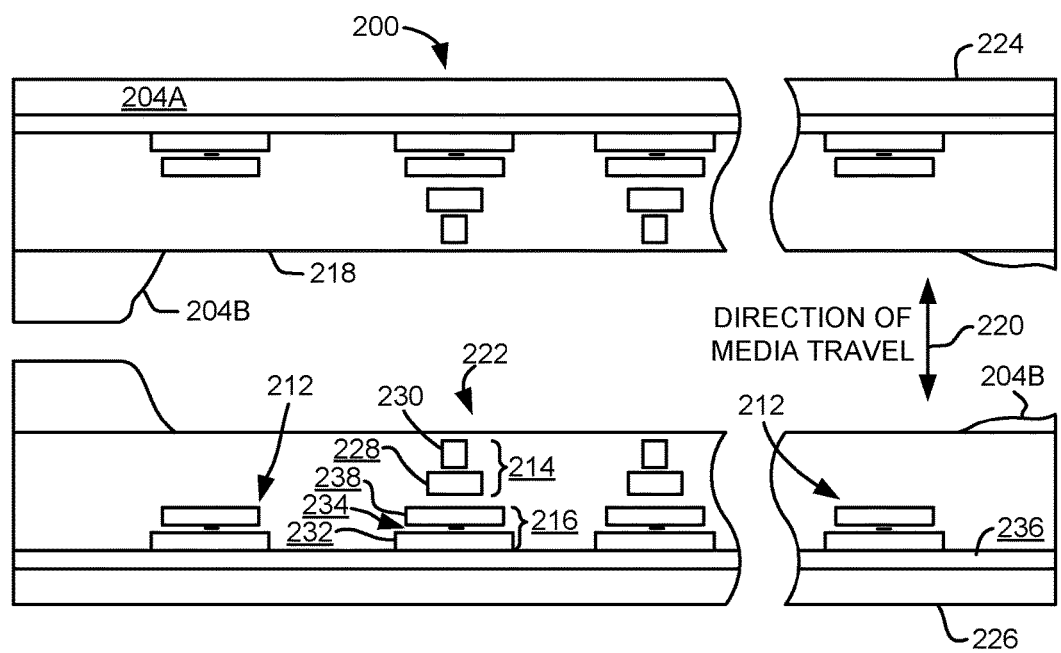
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
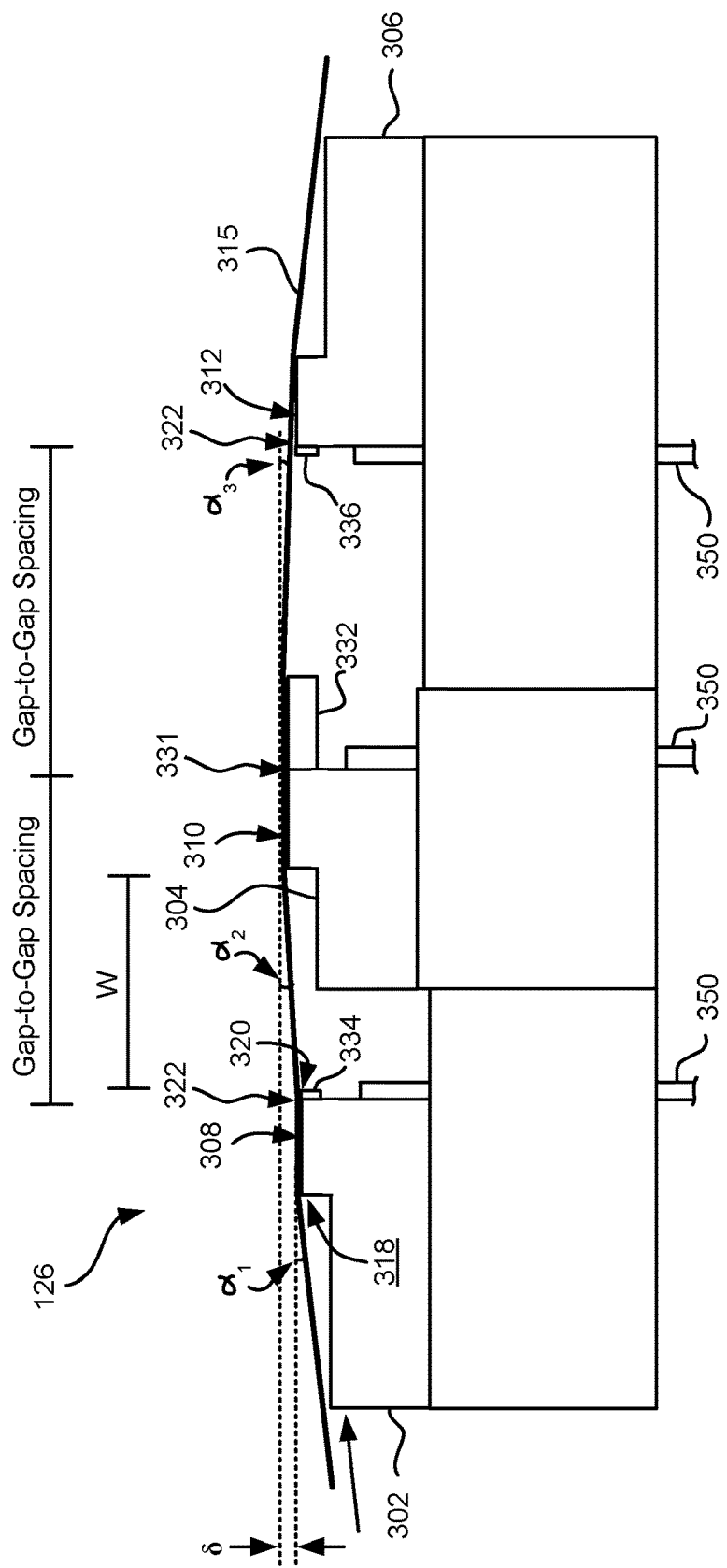
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
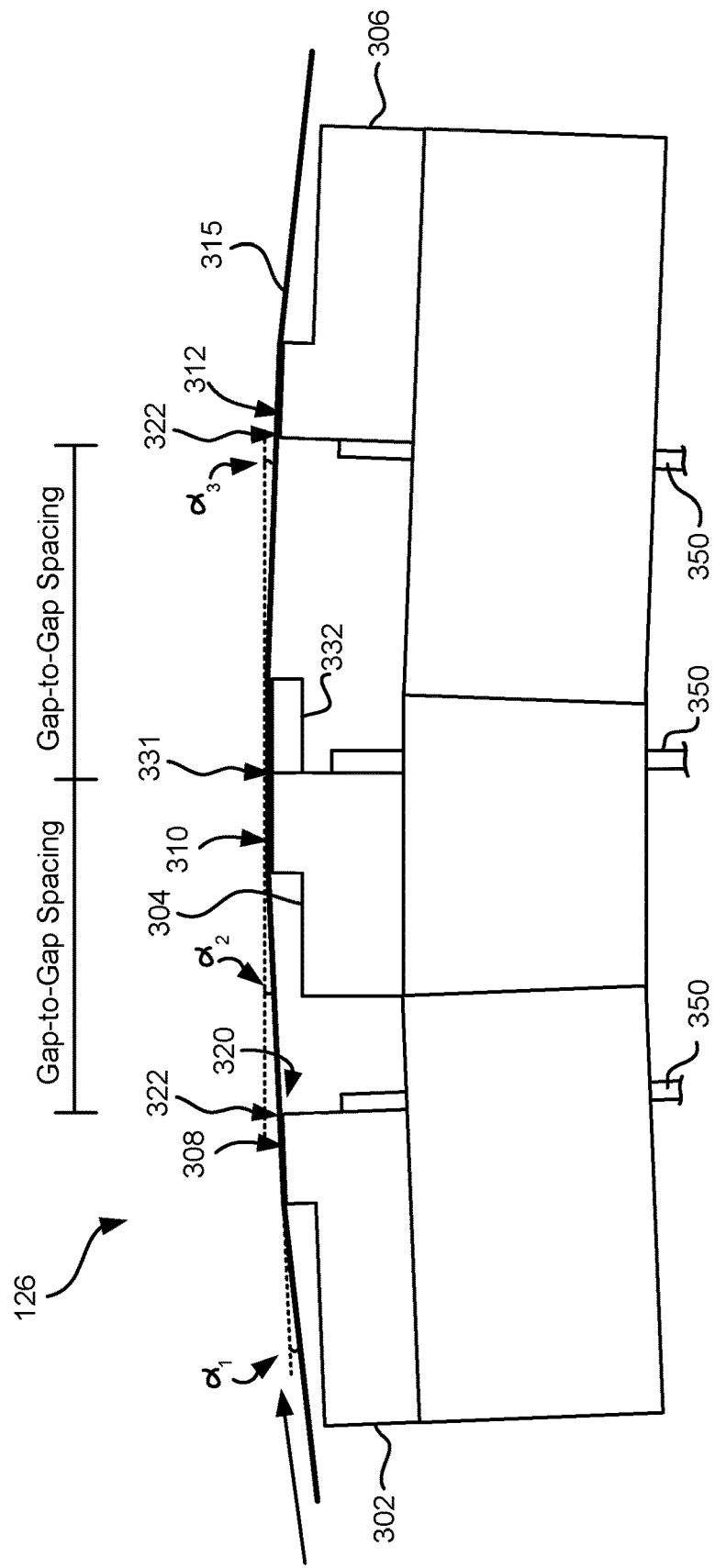
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
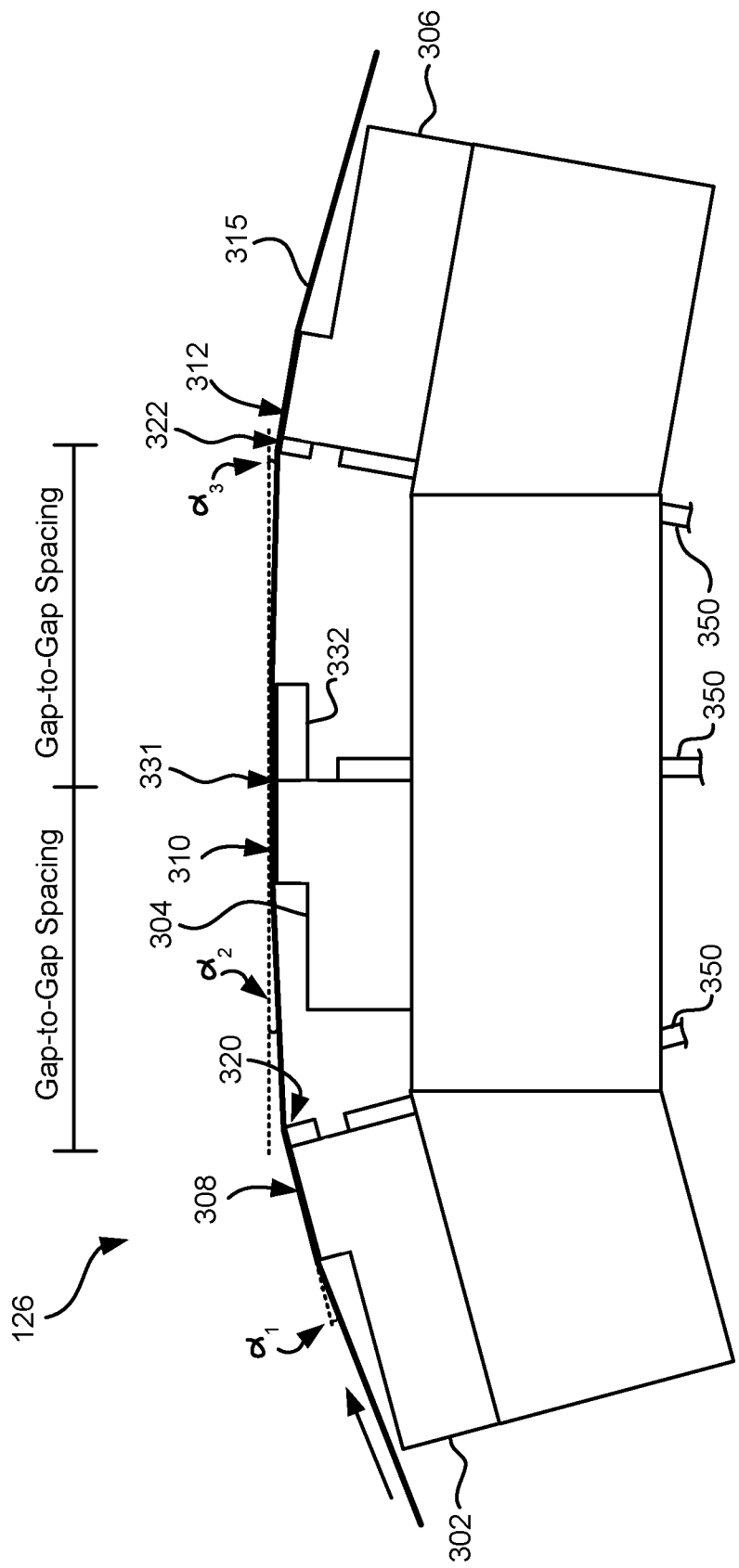
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
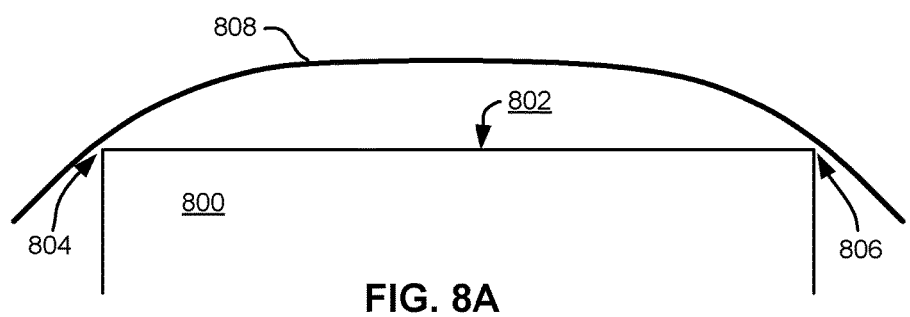
FIGS. 8A-8C are schematics depicting the principles of tape tenting.
Figure 8B:
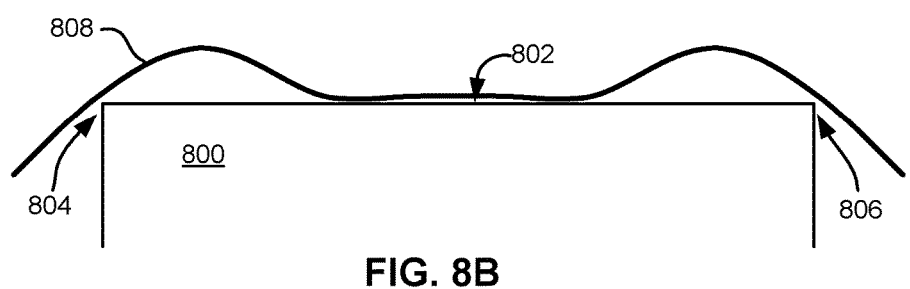
Figure 8C:
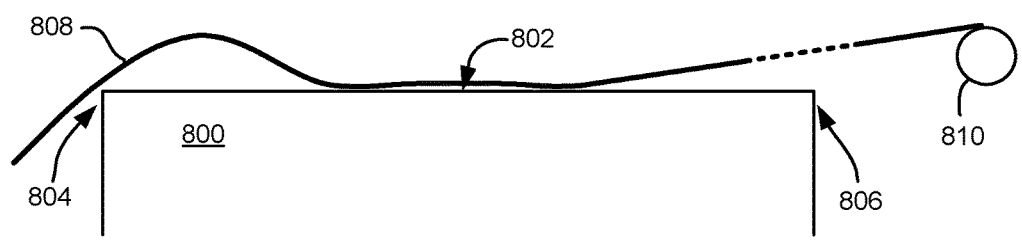

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
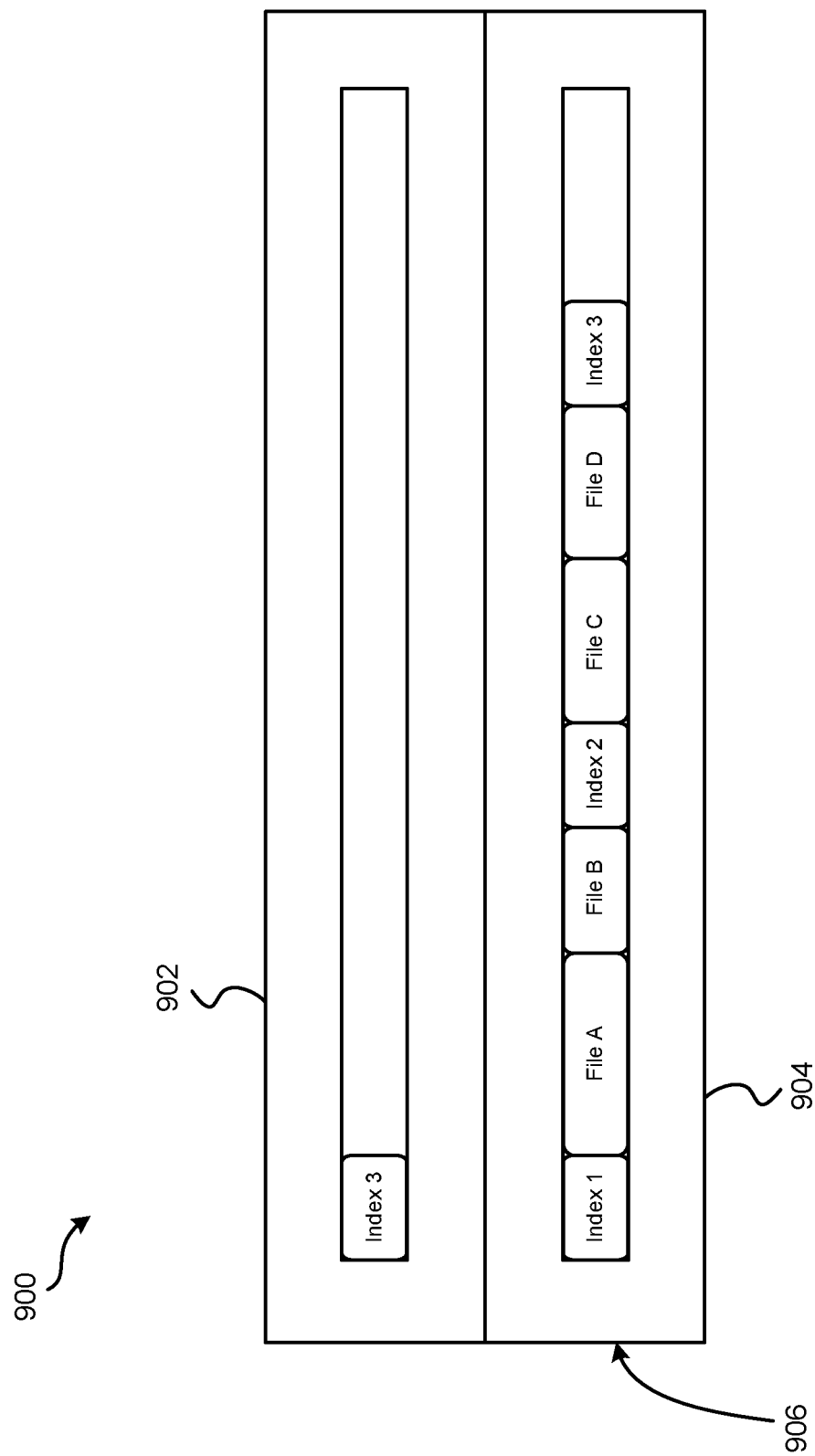
FIG. 9 is a partial representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As previously mentioned, an important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems. Thus, attempts to further increase the storage capacity of magnetic tapes have also involved adjusting what information is actually stored on the medium itself.

For example, products which implement a LTFS write file system meta data in index files which are stored on an index partition of a magnetic tape. These index files are also written on a data partition of the magnetic tape periodically during use. The meta data included in such an index file typically includes one or more corresponding file names, file paths, access controls, time stamps, etc. Moreover, these index files are sometimes formatted in an XML file format, each of which may consume around 1000 bytes of storage space. It follows that for situations involving a large number of files stored on a magnetic tape, the total size of the index files is also significantly large.

In sharp contrast, various ones of the embodiments included herein are able to temporarily store index information on unused areas of the magnetic tape, rather than on the data partition itself among the various files. As a result, the effective storage capacity of a magnetic tape is significantly increased without sacrificing data integrity, even following an unplanned disaster situation, e.g., as will be described in further detail below.

As would be appreciated by one skilled in the art, tape drives write data sequentially on magnetic tapes. Accordingly, file marks are implemented in some instances in order to indicate the separation between different files. When a file mark is written, the file mark not only indicates the separation between two pieces of data but also ensures that the data is actually written to the tape.

Some of the embodiments included herein also incorporate a buffer in order to accumulate data that is to be written to magnetic tape. In some approaches, a ready response is returned to a host (e.g., user) from the tape drive in the normal writing operation at the time which data is written from the host temporarily into the buffer. Thereafter, the data may actually be written to the magnetic tape at a time which is desirable for the tape drive. Accordingly, the host (or host application) that received the ready response can subsequently proceed to issue additional write commands to the tape drive. This allows for high-speed data writing to be achieved without causing the magnetic tape to actually stop moving.

However, specifications have dictated that this ready response is made after all the pieces of data for which writing requests were made prior to the file mark have actually been written to the tape. This ensures that data can be reliably read, regardless of subsequent disaster situations, e.g., such as a power outage. Additionally, specifications outline that the ready response should be returned after the buffer has been emptied and all the pieces of data have been written to the tape. As a result, the process of actually writing to the magnetic tape is not always able to keep up with the rate at which the magnetic tape advances. Thus, some of the conventional products have been forced to rewind the magnetic tape (also referred to herein as "backhitching") in some instances to compensate for such gaps. However, this backhitching process takes several seconds to perform, thereby causing the transfer rate to decrease for conventional products, particularly in situations where many file marks are written.

Figure 10A:
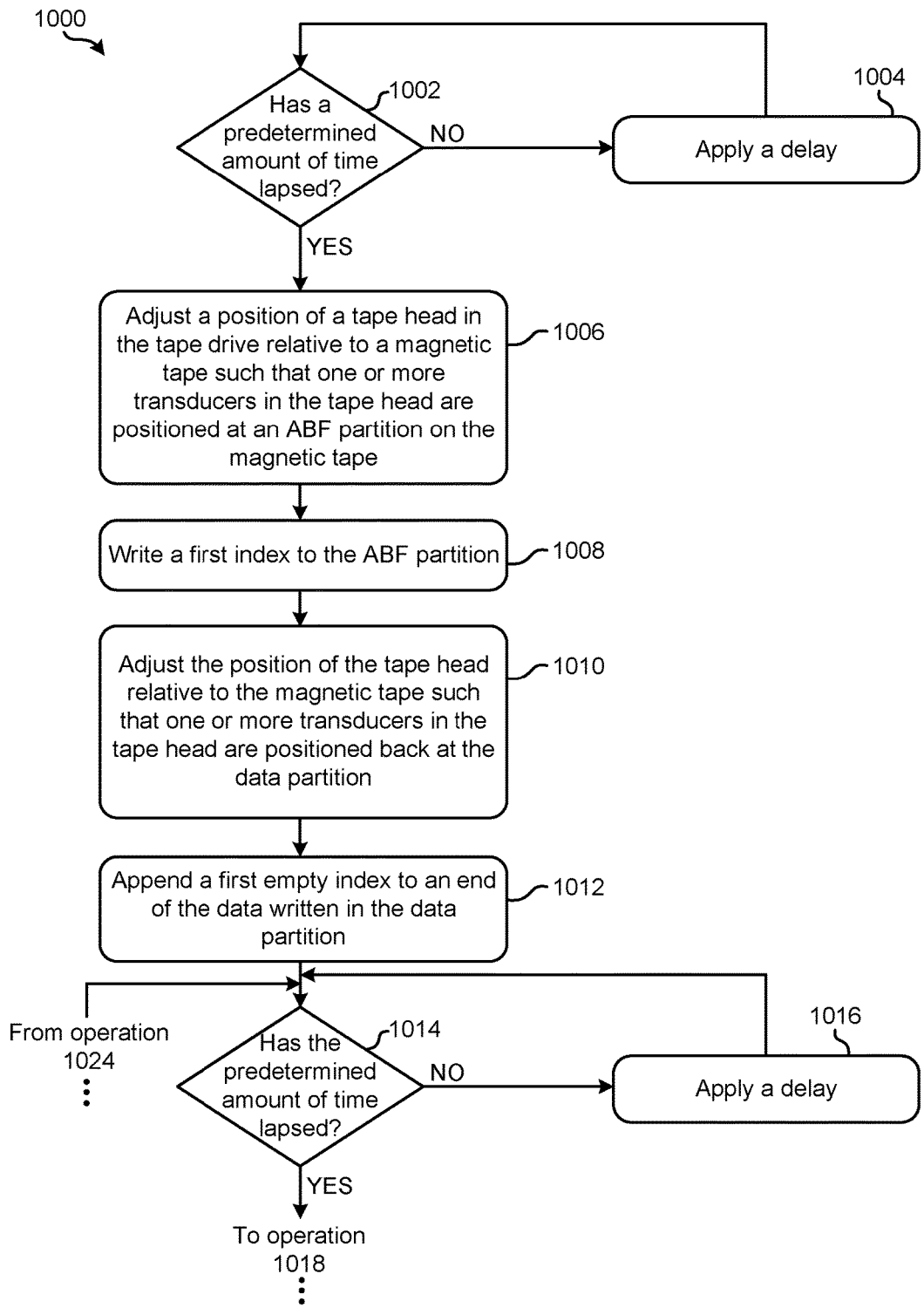
FIG. 10A is a flowchart of a method according to one embodiment.
Figure 10A:
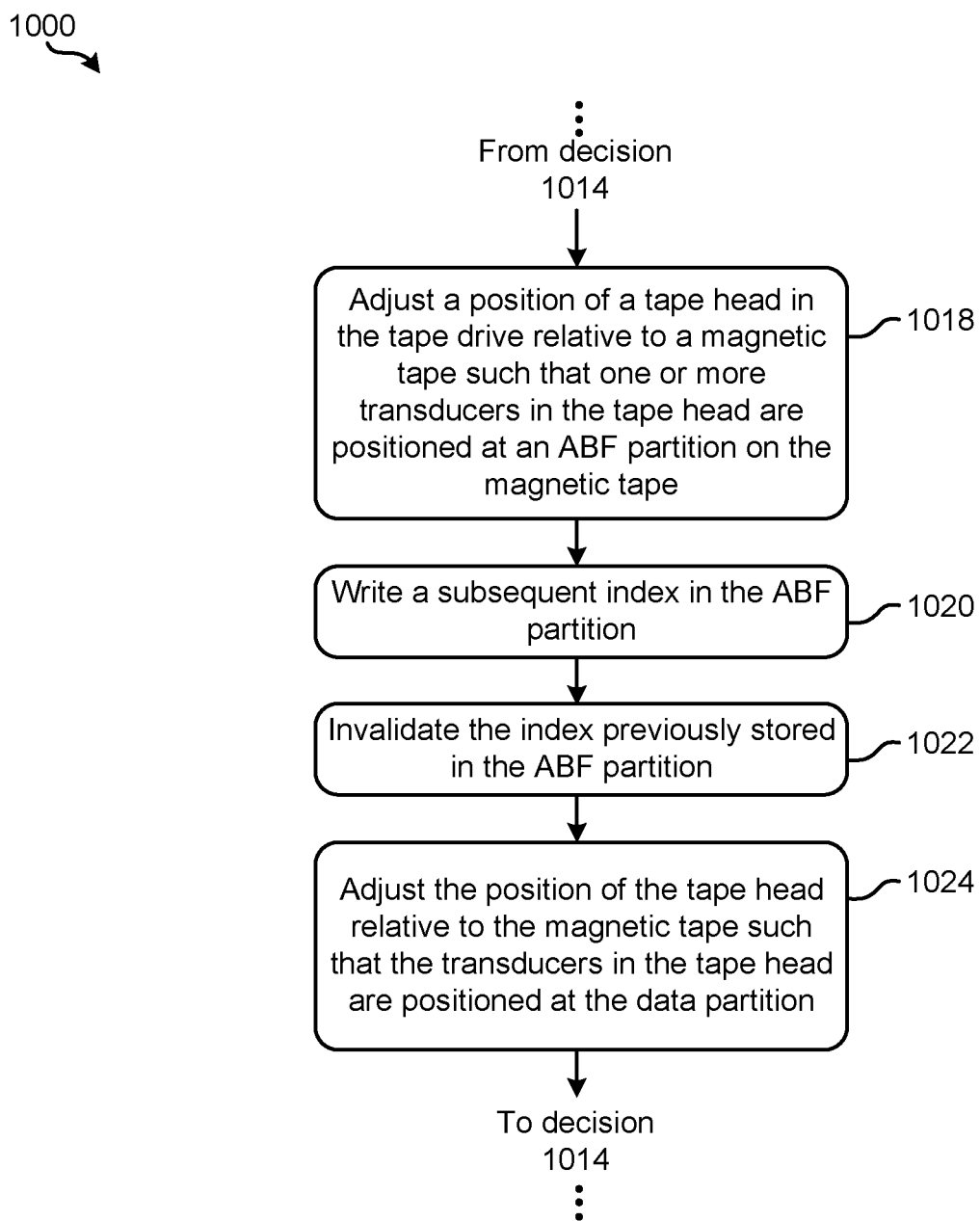

Alternatively, FIG. 10A illustrates a flowchart of a method 1000 according to one embodiment. The method 1000 may be performed in accordance with the present invention in any of the environments depicted in FIGS. 1A-9, among others, in various embodiments. Of course, more or less operations than those specifically described in FIG. 10A may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, a computer, etc., or some other device having one or more processors therein. Thus, in some embodiments, method 1000 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

It should also be noted that in some approaches, method 1000 is performed independent of any standard tape drive operations. In other words, one or more of the processes included in method 1000 are performed in the background and do not significantly hinder any of the ongoing read and/or write operations being performed. Rather, one or more buffers are used to maintain seamless integration with user applications, e.g., as will be described in further detail below.

As shown in FIG. 10A, decision 1002 of method 1000 includes determining whether a predetermined amount of time has lapsed. Depending on the approach, the amount of time may be predetermined by a system administrator, a user, industry standards, etc. Moreover, the determination made in decision 1002 is preferably made with respect to a previous lapse of the predetermined amount of time.

The flowchart proceeds to operation 1004 in response to determining that the predetermined amount of time has not yet lapsed. There, operation 1004 includes applying a delay which allows for an amount of time to pass before decision 1002 is revisited. Thus, decision 1002 and operation 1004 may be repeated in a recursive fashion until it is determined that a predetermined amount of time has finally lapsed, at which point method 1000 proceeds to operation 1006. Prior to determining that the predetermined amount of time has lapsed, the tape drive is able to satisfy various data read and/or write operations. Thus, between lapses in the predetermined amount of time, data is typically being read from and/or written to the data partition.

Operation 1006 includes adjusting a position of a tape head in the tape drive relative to a magnetic tape such that one or more transducers in the tape head are positioned at an accumulating backhitchless flush (ABF) wraps on the magnetic tape. As mentioned above, one or more of the processes included in method 1000 are performed by a computer which is positioned in a tape drive itself or a portion thereof such as the controller, the tape, an external host, a server, etc., depending on the desired approach. Thus, in some approaches the process of adjusting a position of the tape head in the tape drive relative to the magnetic tape includes sending one or more instructions to coarse and/or fine actuators in the tape drive to induce relative motion between the tape head and the magnetic tape being passed thereover. Moreover, the relative motion induced as a result of the one or more instructions is preferably sufficient to align one or more of the transducers on the tape head with the ABF wraps on the magnetic tape.

As would be appreciated by one skilled in the art, magnetic tape is divided into a number of data bands which are separated by servo bands, and each of the data bands are further divided into a number of data tracks. Further still, certain data tracks can be defined as corresponding to a certain "partition" of the magnetic tape. For instance, as previously mentioned, an "index partition" may be configured to record metadata (meta information), e.g., such as file allocation information (Index), while a "data partition" may be configured to record the body of the data, e.g., the data itself. Moreover, the "ABF wraps" actually reside in a data partition (or portion thereof) which has been at least temporarily repurposed to store index related metadata according to any of the approaches described herein.

Figure 10B:
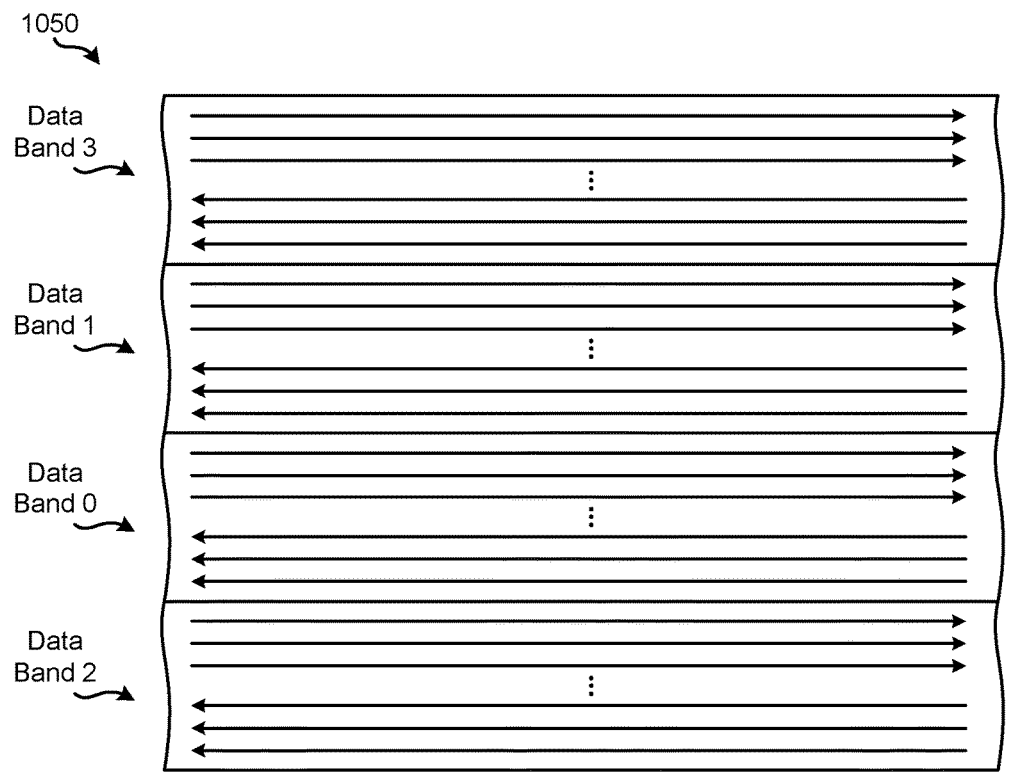
FIG. 10B-10C are partial representational views of data bands on a magnetic tape according to one embodiment.
Figure 10C:
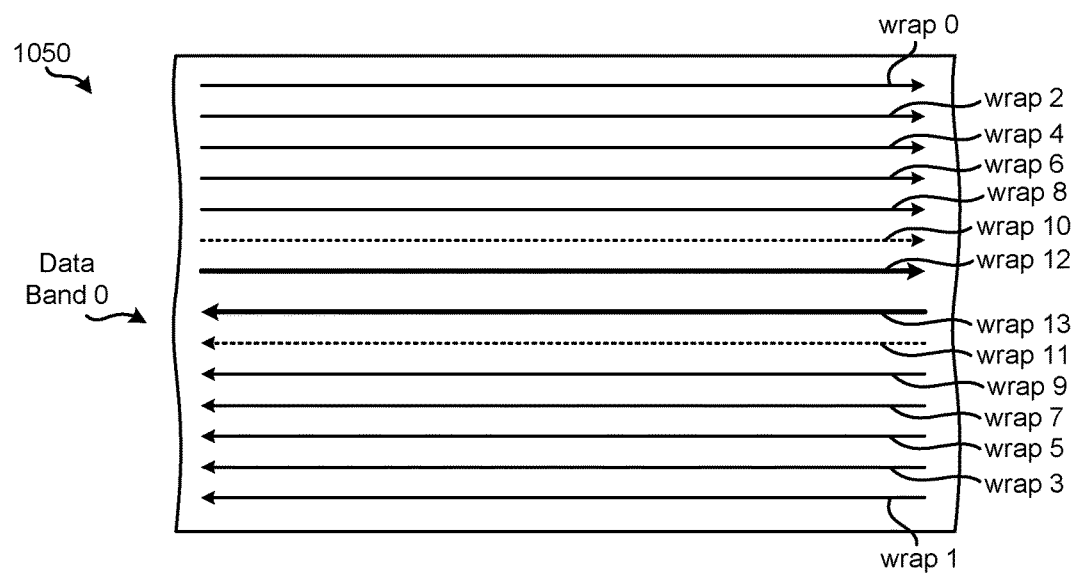

For instance, referring momentarily to FIGS. 10B-10C, a partial representational view of data bands on a magnetic tape 1050 are illustrated in accordance with an exemplary embodiment, which is in no way intended to limit the invention. More specifically, FIG. 10B shows that the magnetic tape is divided into four distinct data bands Data Band 0, Data Band 1, Data Band 2, Data Band 3. Each of the data bands has "n" wraps, of which the even wraps are shown as being accessed (e.g., read from and/or written to) in a "forward direction" towards the end of tape, while the odd wraps are accessed in a "backward direction" back towards the beginning of tape as indicated by the arrows.

Looking now to FIG. 10C, assuming there are only 14 data wraps in each of the data bands of the magnetic tape, as the magnetic head in a tape drive writes data on the magnetic tape from wrap 0, wrap 1, wrap 2, and so on, when writing on wrap 0 to wrap 8, the tape drive allocates wrap 12 and wrap 13 as ABF wraps according to the present approach. Note that the arrowed lines representing wrap 12 and wrap 13 have been bolded to represent this allocation, while the arrowed lines representing wrap 10 and wrap 11 have been dashed to indicate that they have not yet had data written thereto (e.g., they are empty data wraps). Again, wraps of a magnetic tape are preferably allocated as ABF wraps only temporarily. In other words, the ABF wraps exist in the data partition in that the ABF wraps are dynamically allocated on the data partition and are eventually reallocated as data wraps. Accordingly, it should be understood that the ABF wraps are a part of the data partition. However, the ABF wraps are used to store index information for a time before eventually being used as (e.g., reverted to) a data wrap to store actual data, e.g., as would be appreciated by one skilled in the art after reading the present description.

Returning to FIG. 10A, method 1000 proceeds from operation 1006 to operation 1008 where a first index is written in the ABF wrap. Again, prior to determining that the predetermined amount of time has lapsed, the tape drive is able to satisfy various data read and/or write operations. Thus, the first index written in the ABF wrap preferably corresponds to any data (e.g., files, objects, records, etc.) written in the data partition of the magnetic tape prior to determining that the predetermined amount of time has lapsed. In other words, the first index corresponds to data written in the data partition on the magnetic tape in some approaches.

In response to writing the first index in the ABF wrap, operation 1010 includes adjusting the position of the tape head relative to the magnetic tape such that one or more transducers in the tape head are positioned back at the data partition. Any one or more of the approaches described above in regards to operation 1006 may be implemented in order to perform operation 1010. Moreover, operation 1012 includes appending a first empty index to an end of the data written in the data partition. In other words, operation 1012 includes writing an empty index such that it is appended to an end of the data stored in the data partition at the point that the lapse of the predetermined amount of time was detected.

With respect to the present description, an "empty index" is intended to refer to a minimal (e.g., simplified) copy of a complete index entry. Thus, although the actual contents of a given empty index may vary depending on the approach, the size of (e.g., amount of data in) the empty index is less than a size of the index which it corresponds to. In other words, the size of (e.g., amount of data in) the first empty index is preferably significantly less than a size of the first index. As a result, by implementing empty indexes in the data partition to serve as placeholders of sorts, the amount of storage capacity consumed by maintaining index information during operation is significantly reduced. Moreover, one or more of the empty indexes may be used and/or updated in response to experiencing a disaster event or receiving an unmount command in order to ensure that data integrity is maintained on the magnetic tape, e.g., as will be described in further detail below.

According to an exemplary approach, which is in no way intended to limit the invention, each empty index includes a beginning file mark, an end of record entry, and a closing file mark. The beginning and closing file marks sandwich the end of record entry therebetween, and are thereby able to help locate the end of record entry, at least with respect to the other data stored in the data partition. Each of the beginning file mark and the closing file mark have an effective size of about 32 bytes, but could be larger or smaller depending on the desired approach. Moreover, the end of record entry corresponds to the respective index in the ABF wrap, and thereby has an effective size of 32×n bytes, where "n" represents the record number of the corresponding index in the ABF wrap. As a result, the consistency of the record numbers is ensured to the extent that read errors due to inconsistent record numbers are desirably prevented.

From operation 1012, method 1000 proceeds to decision 1014 which includes determining whether the predetermined amount of time has lapsed again. In other words, decision 1014 includes determining whether another period has elapsed since the determination made previously in decision 1002. As before, a delay is applied in response to determining that the predetermined amount of time has not yet lapsed again. See operation 1016. The delay allows for an amount of time to pass before decision 1014 is revisited. Thus, decision 1014 and operation 1016 may be repeated in a recursive fashion until it is determined that a predetermined amount of time has finally lapsed, at which point method 1000 proceeds to operation 1018. Prior to determining that the predetermined amount of time has lapsed, the tape drive is able to satisfy various data read and/or write operations. Thus, between lapses in the predetermined amount of time, data is typically being read from and/or written to the data partition.

Looking to operation 1018, the position of the tape head relative to the magnetic tape is adjusted such that one or more of the transducers in the tape head are positioned at the ABF wrap on the magnetic tape. Any one or more of the approaches described above with respect to operation 1006 may be implemented in order to perform operation 1018. Furthermore, operation 1020 includes writing a subsequent index in the ABF wrap (here a second index). The second index corresponds to data written in the data partition after the first empty index and up to the point of determining that the predetermined amount of time had lapsed.

Moving to operation 1022, the index previously stored in the ABF wrap (here the first index) is invalidated. Each index stored in the ABF wrap effectively obviates any previously written indexes. Thus, as new indexes are written in the ABF wrap, the previously written index is preferably invalidated, e.g., in order to minimize the amount of storage capacity consumed, avoid complications, streamline operations, etc.

In response to writing the second index in the ABF wrap, method 1000 proceeds to operation 1024, which includes adjusting the position of the tape head relative to the magnetic tape such that the transducers in the tape head are positioned at the data partition again. Accordingly, a second empty index is appended to an end of the data written in the data partition after the previous empty index (here the first empty index). In other words, operation 1012 includes writing another empty index such that it is appended to an end of the data which was stored in the data partition between the previous empty index and the point that the lapse of the predetermined amount of time was again detected. Moreover, a size of the second empty index is preferably significantly less than a size of the second index, e.g., as described above.

From operation 1024, method 1000 returns to decision 1014 in order to determine whether another lapse of the predetermined amount of time has occurred. It follows that operations 1018, 1020, 1022, and 1024 may be repeated in a recursive fashion as desired during normal operation of the tape drive. However, certain situations may cause an interruption in the progression of method 1000. For example, an unmount command is received at some point from a user, storage controller, user application, etc., signaling the tape drive to stop operation and remove the magnetic tape therefrom. In more serious examples, a disaster situation, e.g., such as a loss of power, drive failure, etc., may occur during operation and interrupt the process of writing data and/or managing the indexes which correspond to the data. Accordingly, the flowchart of method 1000 may be interrupted at any point and subsequent processes may be implemented, e.g., as will be described in further detail below.

Looking now to FIGS. 11A-11H, representational views of a magnetic tape 1100 having an index partition 1102, a data partition 1104, and an ABF wrap 1106 are illustrated in accordance with an in-use example, which is in no way intended to limit the invention. As an option, the present magnetic tape 1100 may be implemented in conjunction with features from any other embodiment listed herein, such as those described with reference to the other FIGS. For instance, it should be noted that the progressions shown in each of the representational views of FIGS. 11A-11H follow the progression of method 1000 in FIG. 10A above. However, such magnetic tape 1100 and others presented herein may be used in various applications and/or in permutations which may or may not be specifically described in the illustrative embodiments listed herein. Further, the magnetic tape 1100 presented herein may be used in any desired environment. Thus FIGS. 11A-11H (and the other FIGS.) may be deemed to include any possible permutation.

When a magnetic tape is loaded into a tape drive, the tape drive is able to determine certain characteristics of the magnetic tape by accessing information stored in the tape cartridge memory, reading metadata stored in a header on the magnetic tape, scanning a barcode on an exterior surface of the tape cartridge, etc. Thus, a tape drive is able to tailor performance based on the type of magnetic tape, a specific format of the magnetic tape, etc. As mentioned above, LTFS is an exemplary format of a file system that may be implemented in a given library in order to enables access to compliant tapes. It should be appreciated that various embodiments herein can be implemented with a wide range of file system formats. However, to provide a context, and solely to assist the reader, some of the embodiments below may be described with reference to LTFS which is a type of file system format. This has been done by way of example only, and should not be deemed limiting on the invention defined in the claims.

Accordingly, when a tape drive detects that an LTFS formatted magnetic tape has been loaded therein, the tape drive enters an LTFS mode. For example, the tape drive is able to detect LTFS formatted magnetic tape has been loaded therein in response to determining that "LTFS" is written in the Implementation Identifier having the VOL1 label residing in the first record on the partition, e.g., as would be appreciated by one skilled in the art after reading the present description.

Figure 11A:
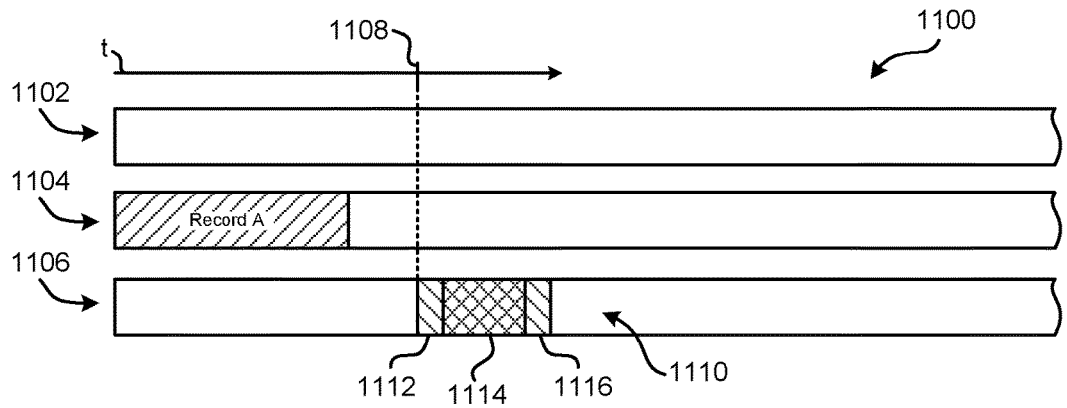
FIG. 11A-11H are partial representational diagrams of files and indexes stored on the partitions of a magnetic tape according to several in-use embodiments.

Looking to FIG. 11A, data Record A is written to data tracks in the data partition 1104 of the magnetic tape 1100. As time t progresses, a predetermined amount of time eventually lapses 1108, thereby signifying the close of a temporal period. As a result, the position of the tape head relative to the magnetic tape is adjusted such that one or more transducers thereon are able to write a first index 1110 in the ABF wrap 1106. As mentioned above, although the data partition 1104 and the ABF wrap 1106 are actually different partitions on the magnetic tape 1100, they may actually be located in the same data band, thereby reducing the amount of time spent transitioning therebetween. Moreover, the wrap used as the ABF wrap 1106 may actually be repurposed and used as a data partition to store data thereon at a later point in time, e.g., as would be appreciated by one skilled in the art after reading the present description.

The first index 1110 is further shown as being sandwiched by a beginning file mark 1112 and a closing file mark 1116. File markers are written using a write FM command in some approaches which differs from the typical write command used to write data to the magnetic tape. For instance, when data is written by the sequential tape drive, the tape drive moves the tape head to the End of Data in the data partition 1104 and subsequently writes the data of the file. However, the file mark acts as a similar trigger which initiates the process of writing the index to the ABF wrap 1106 as shown. In some approaches, each file marker includes four bytes in order to minimize the amount of storage capacity consumed while also maintaining the consistency of the record numbers through writing an empty index which does not include any other file information.

Figure 11B:
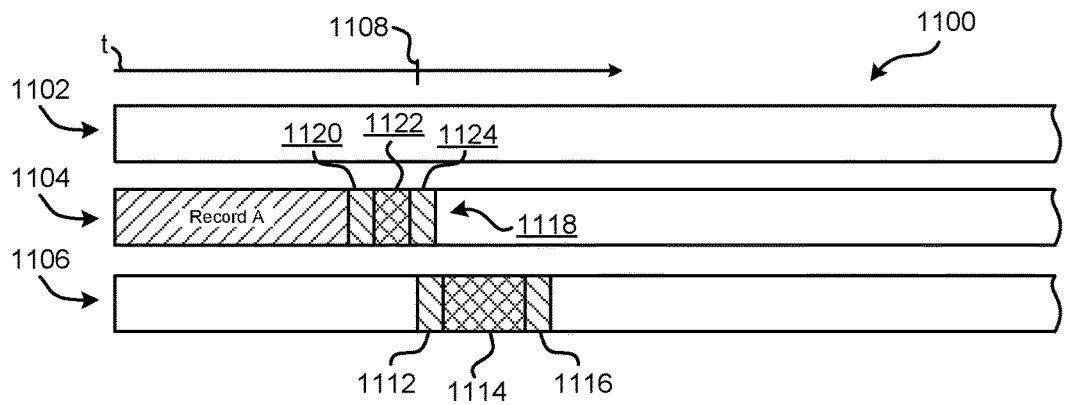

After writing the first index 1110, the tape head is again moved relative to the magnetic tape such that one or more of the transducers thereon are able to write a first empty index 1118 in the data partition 1104 of the magnetic tape 1100, e.g., as shown in FIG. 11B. The first empty index is further shown as including a beginning file mark 1120, a closing file mark 1124, and an end of record 1122 sandwiched therebetween. The end of record includes a number which matches the number of the corresponding index written in the ABF wrap 1106, e.g., in order to ensure that the record numbers are not changed. Thus, in disaster situations such as unintentional power loss scenarios, an empty index located in the data partition 1104 may be used to identify an index entry written on the ABF wrap 1106, e.g., as will be described in further detail below. It should be noted that in some approaches an empty index having no file information may also be stored in a segment of the memory buffer reserved for the LTFS. Thus, at the time of mounting the LTFS and moving the drive's position to the data partition, the empty index may be accessed from the memory buffer and written to the magnetic tape upon returning from the ABF wrap 1106, e.g., as would be appreciated by one skilled in the art after reading the present description.

Once the first empty index 1118 has been written to the data partition 1104, data which may have been accumulating in a buffer during the indexing process is written to the data partition 1104 and a ready response is subsequently returned to the host, host application, controller, etc., from which the data is being received. Similarly, the tape drive is able to move the position of the magnetic head to an appropriate record on the magnetic tape when satisfying a read request without actually writing anything to the position from which the data is read.

Figure 11C:
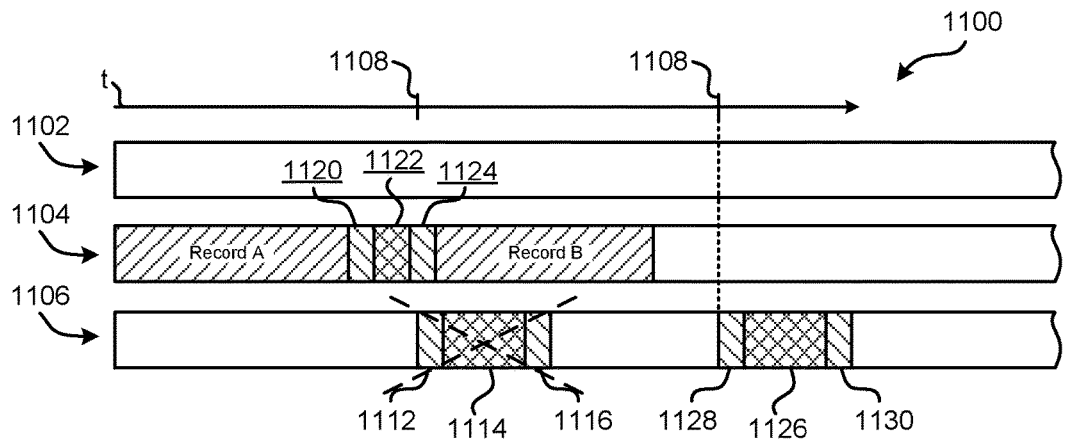

Looking to FIG. 11C, data Record B continues to be written to the data partition 1104. Specifically, the data Record B is appended to the closing file mark 1124. Although there may be temporary lapses in the stream of data received, upon reaching the close of another temporal period 1108, the tape head is again moved to the ABF wrap 1106. There, a second index 1126 sandwiched by a beginning file mark 1128, and a closing file mark 1130 are written to the magnetic tape 1100. The first index 1114 is also invalidated. Specifically, the location information of data on the ABF is overwritten by the information of the new index and, thereby, the old index becomes inaccessible and is consequently invalidated. It follows that each of the indexes written to the ABF wrap 1106 only exist for one period of the predetermined amount of time.

Figure 11D:
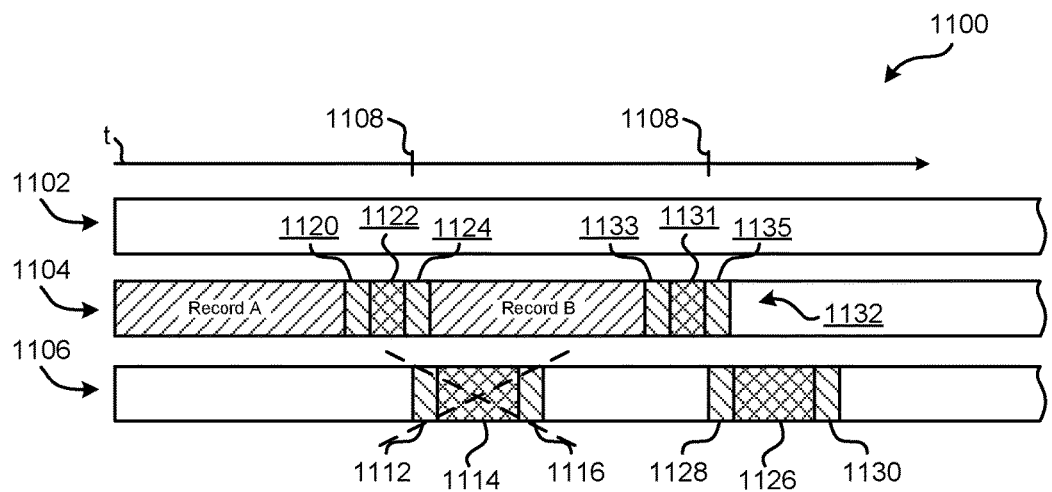

Moving to FIG. 11D, a second empty index 1132, having an end of record 1131 sandwiched between beginning and closing file marks 1133, 1135 respectively, is appended to the End of Data (here an end of Record B) before additional data is written to the data partition 1104 of the magnetic tape 1100. As previously mentioned, this process repeats itself in an iterative fashion. However, certain events may occur which disrupt the cycle of writing data and indexes to the magnetic tape. For example, an unmount command may be received at any time, indicating that the magnetic tape is to be unmounted from the tape drive and potentially returned to storage. The point at which the unmount command is received also has an effect on how the magnetic tape is actually unmounted. For instance, if the unmount command is received at a point where the index included in the ABF wrap 1106 is the latest index information (e.g., as shown in FIG. 11D), it may be used to update the index partition 1102.

Figure 11E:
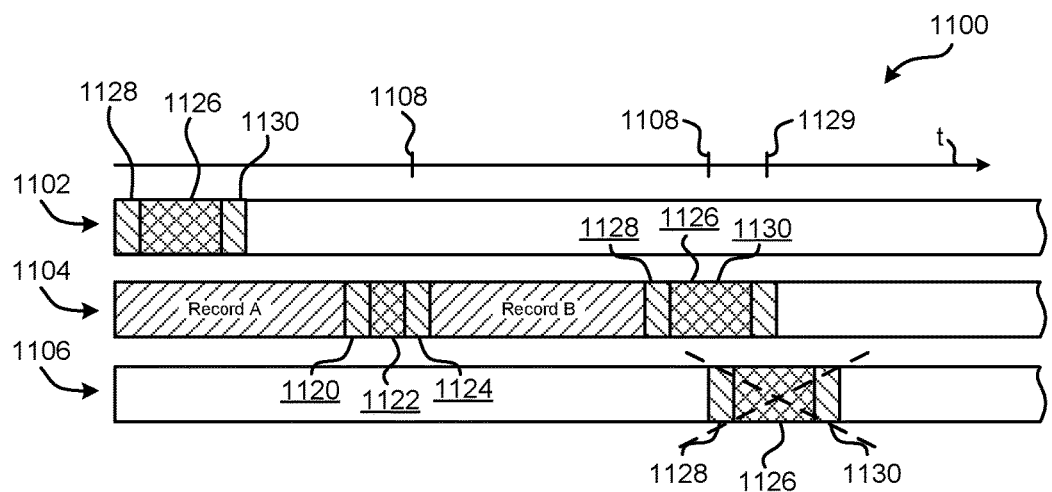

Looking to FIG. 11E, the second index 1126 and file marks 1128, 1130 are read and used to overwrite the second empty index in the data partition 1104 in response to receiving an unmount request 1129. The second index 1126 is further invalidated from the ABF wrap 1106 before adjusting the position of the tape head such that the second index 1126 and file marks 1128, 1130 are copied to the index partition 1102. The process of writing the second index 1126 and file marks 1128, 1130 to the index partition 1102 may serve as a trigger to perform (e.g., "satisfy") a remainder of the unmounting process, e.g., such as rewinding the magnetic tape onto a supply reel, loading the magnetic tape back into a supply cartridge, etc.

Figure 11F:
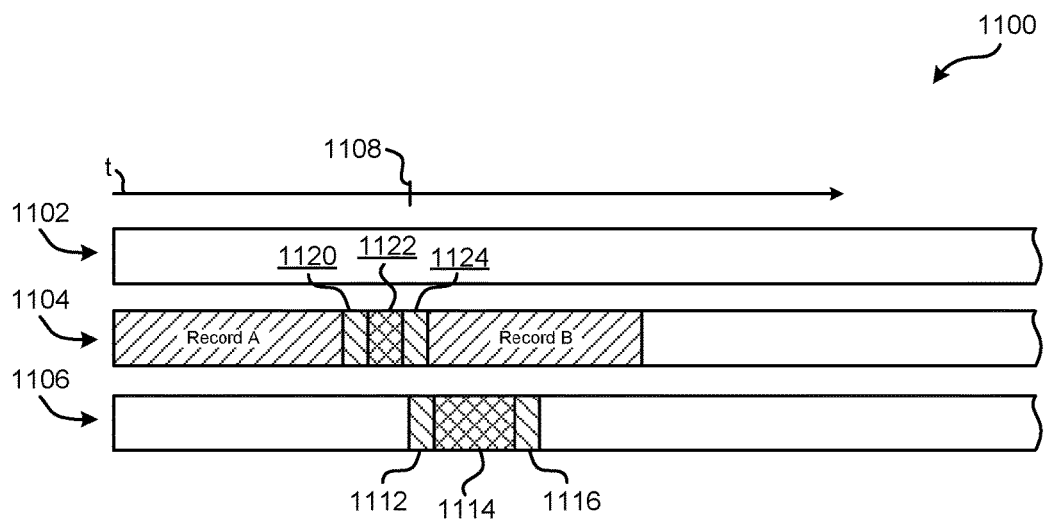
Figure 11G:
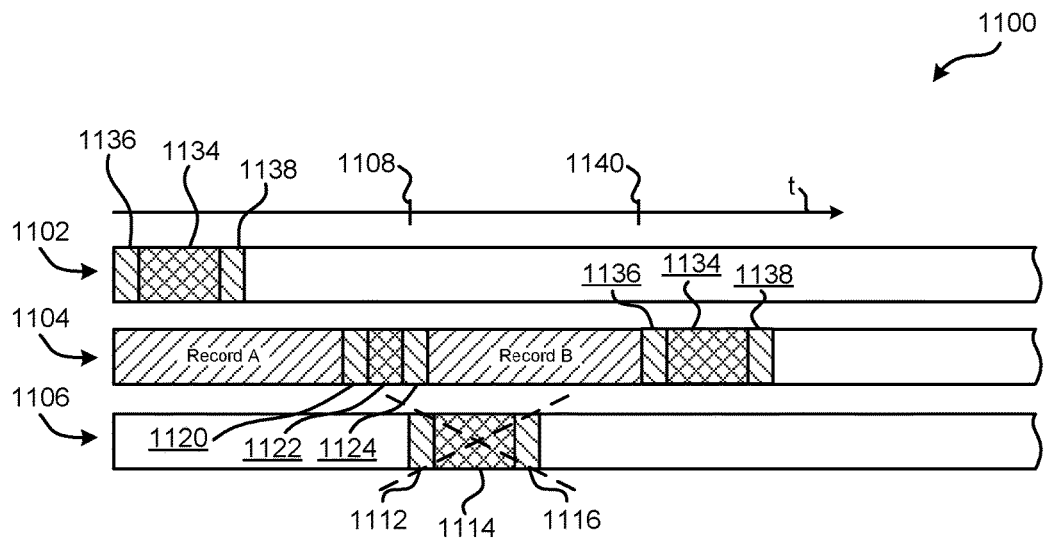
Figure 11H:
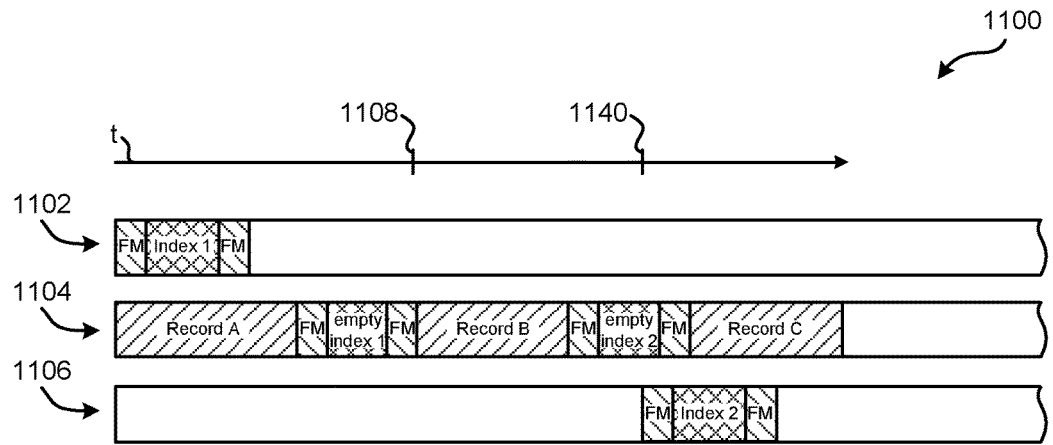

However, looking to FIG. 11F, unmount commands are sometimes received at a point where the index which exists in the ABF wrap 1106 is outdated (e.g., has not yet been updated). In such situations where the index 1114 existing in the ABF wrap 1106 is not the latest one, the latest index 1134 is generated on the spot and written directly to the data partition 1104, along with file markers 1136, 1138 as shown in FIG. 11G. Specifically, the latest index 1134 and file markers 1136, 1138 are appended to an end of the data currently stored in the data partition 1104 in response to receiving an unmount request 1140. The index 1114 in the ABF wrap 1106 is also invalidated. From there, the tape drive adjusts the magnetic head such that it is able to copy the latest index 1134 and file markers 1136, 1138 directly to the index partition 1102. The process of writing the latest index 1134 and file markers 1136, 1138 to the index partition 1102 may serve as a trigger to perform (e.g., "satisfy") a remainder of the unmounting process, e.g., such as rewinding the magnetic tape onto a supply reel, loading the magnetic tape back into a supply cartridge, etc.

It follows that for some unmounting processes, unmounting the LTFS on the drive side is performed in response to aligning the tape head with the data partition. It should also be noted that from the viewpoint of the drive, the request to move the position to the index partition arrives while the drive is repositioning the tape head to the data partition after the drive writes the index in the ABF wrap and returns the ready response in some approaches, e.g., as would be appreciated by one skilled in the art after reading the present description.

Referring still to FIGS. 11F-11G, the next time the magnetic tape is mounted into a tape drive, the file system will attempt to restart using whatever index is located in the index partition 1102, written there as a result of the last unmounting procedure. The information stored in the index partition 1102 thereby allows the file system to locate the latest index 1134 written to the data partition 1104 which in turn is used to identify the various data Record A, Record B stored in the data partition 1102, as well as any other indexes connected by back-pointers (not shown).

Although most magnetic tapes are intentionally unmounted as a result of receiving an unmount command, in some situations a disaster situation may be experienced. For instance, supply power for the tape drive may be lost, the tape drive itself may fail, a user may be forced to perform a hard reset, etc.

In these disaster situations where the magnetic tape and/or file system is not properly unmounted, an index stored in the index partition may be outdated. The in-use example shown in FIG. 11H mirrors those illustrated in FIGS. 11A-11G, and corresponds to a situation where a copy of Index 1 is stored in the index partition 1102 (e.g., as a result of a previous intended unmount operation), and a number of empty indexes empty index 1, empty index 2 are interspersed among the data Record A, Record B, Record C. Moreover, an index entry Index 2 has been stored in the ABF wrap 1106.

Upon remounting the magnetic tape in the tape drive and/or restarting the file system, the file system uses Index 1 written in the index partition 1102 to identify the data Record A which was written prior to empty index 2. The file system is further able to advance and locate the file marks FM sandwiching empty index 2, but because this is an empty index, the full index entry Index 2 in the ABF wrap 1106 is consulted in order to gain access to Record B from the data partition 1104 as well. Thus, the Record A and Record B may be read, but Record C cannot be restored as there is no meta information which the tape drive can use to identify and access Record C from the magnetic tape, e.g., as would be appreciated by one skilled in the art after reading the present description. It follows that the full index entry Index 2 in the ABF wrap 1106 is used to restore at least a portion of the file system of the data written in the data partition in response to experiencing a disaster situation.

Figure 12:
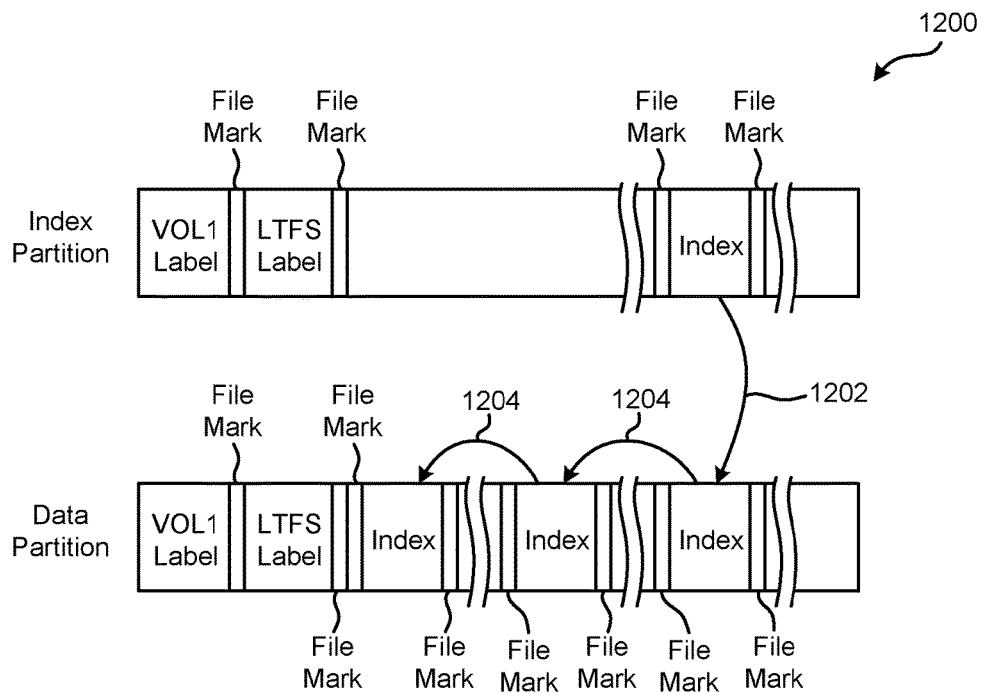
FIG. 12 is a partial representational view of a magnetic tape having back pointers according to one embodiment.

As alluded to above, optional back pointer can be specified in the index of an LTFS. These back pointer elements enable file systems to refer to indexes which are older than a current index. Looking to FIG. 12, the outline of a back pointer is illustrated with respect to a magnetic tape 1200 in accordance with one embodiment. As shown, the back pointer 1202 pointing from the index partition to the index written at the end of the data partition is described in the index of the index partition. Moreover, the back pointer 1204 which points to the previously written index is described in the back pointer written in the index of the data partition, and so forth. As a result, the file systems of past generations may effectively be traced with the use of back pointers as depicted.

In some approaches, a full (e.g., "complete") index which includes the file information of the files on the file system as well as the back pointers, is written in the ABF wrap. Moreover, a record number of the index location written immediately before a given index may be written in the back pointer of the index written in the ABF wrap. In some approaches the back pointer may not be implemented in any of the indexes written to the data partition. Yet in other approaches, the back pointer may only be implemented to point to the first index of the data partition from the last index of the data partition. In still other approaches where back pointers cannot be implemented, "previousegenerationlocation" may be implemented, e.g., as would be appreciated by one skilled in the art after reading the present description.

Figure 13:
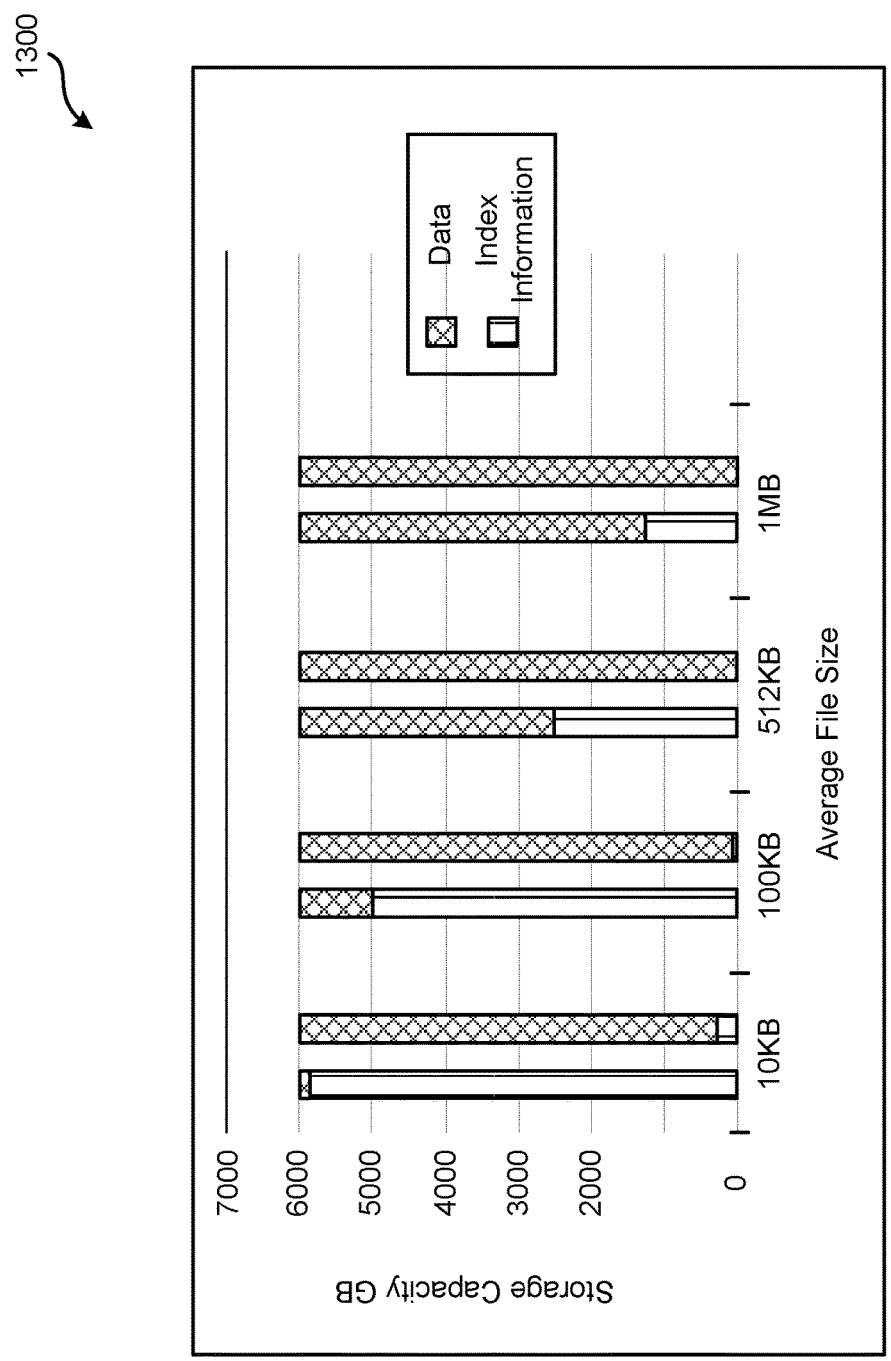
FIG. 13 is a graph illustrating storage capacity with respect to average file size according to several embodiments.

The effective storage capacity achieved as a result of implementing the processes described in the various approaches herein were compared against those achieved using conventional indexing schemes. Specifically, looking to FIG. 13, a graph 1300 (e.g., "bar graph") illustrating an amount of the overall storage capacity of the magnetic tape that index information vs. actual data consumes. This comparison was computed for a number of different average file sizes for a total tape storage capacity which was determined as being 6 terabytes for the given comparison. Moreover, the calculations were conducted under the assumption that the size of the index per file was about 1000 bytes with compressed size of about 480 bytes having taken the compression ratio into account.

Looking to graph 1300, for an average file size of 10 KB, conventional processes (as represented by the left column) reduced the storage capacity of the magnetic tape by 98.1%, compared to a reduction of 4.6% achieved by the approaches described herein (as represented by the right column). Moreover, for an average file size of 100 KB, conventional processes (as represented by the left column) reduced the storage capacity of the magnetic tape by 83.1%, compared to a reduction of 0.5% achieved by the approaches described herein (as represented by the right column). Further still, for an average file size of 512 KB, conventional processes (as represented by the left column) reduced the storage capacity of the magnetic tape by 41.8%, compared to a reduction of 0.1% achieved by the approaches described herein (as represented by the right column). And finally, for an average file size of 1 MB, conventional processes (as represented by the left column) reduced the storage capacity of the magnetic tape by 21.1%, compared to a reduction of 0.0% achieved by the approaches described herein (as represented by the right column).

It follows that the various approaches described herein are able to achieve a significant improvement to the overall storage capacity of magnetic tapes, particularly in comparison with conventional limitations. Moreover, these improvements are experienced for a wide range of file sizes, thereby increasing the applicability of these desirable accomplishments.

Furthermore, any one or more of the embodiments included herein may be implemented in the context of any desired LTFS, e.g., such as Spectrum Archive offered by IBM having a sales address at 1 N. Castle Dr, Armonk, N.Y. 10504. Moreover, various ones of the embodiments included herein may be implemented by a tape drive. It follows that some of the approaches herein can be implemented through modifications to the functions of tape drives, and the LTFS being implemented need not be modified. According to an example, which is in no way intended to limit the invention, some of the embodiments included herein can be implemented on tape drives that support RABF.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
   in response to detecting a first lapse of a predetermined amount of time, adjusting a position of a tape head in the tape drive relative to a magnetic tape such that the tape head is positioned at an accumulating backhitchless flush (ABF) wrap on the magnetic tape;
   writing a first index in the ABF wrap, wherein the first index corresponds to data written in a data partition on the magnetic tape, wherein the ABF wrap and the data partition are different partitions;
   in response to writing the first index in the ABF wrap, adjusting the position of the tape head relative to the magnetic tape such that the tape head is positioned at the data partition; and
   appending a first empty index to an end of the data written in the data partition, wherein a size of the first empty index is less than a size of the first index.

2. The tape drive-implemented method of claim 1, wherein the first empty index includes:
   a first beginning file mark;
   a first closing file mark; and
   a first end of record sandwiched between the first beginning file mark and the first closing file mark,
   wherein the first end of record corresponds to the first index in the ABF wrap.

3. The tape drive-implemented method of claim 1, comprising:
   detecting a second lapse of the predetermined amount of time;
   in response to detecting the second lapse, adjusting the position of the tape head relative to the magnetic tape such that the tape head is positioned at the ABF wrap on the magnetic tape;
   writing a second index in the ABF wrap, wherein the second index corresponds to data written in the data partition after the first empty index;
   invalidating the first index in the ABF wrap;
   in response to writing the second index in the ABF wrap, adjusting the position of the tape head relative to the magnetic tape such that the tape head is positioned at the data partition; and
   appending a second empty index to an end of the data written in the data partition after the first empty index, wherein a size of the second empty index is less than a size of the second index.

4. The tape drive-implemented method of claim 3, wherein the second empty index includes:
   a second beginning file mark;
   a second closing file mark; and
   a second end of record sandwiched between the second beginning file mark and the second closing file mark,
   wherein the second end of record corresponds to the second index in the ABF wrap.

5. The tape drive-implemented method of claim 3, comprising:
   in response to receiving an unmount command, reading the second index from the ABF wrap;
   using the second index to overwrite the second empty index;
   invalidating the second index in the ABF wrap;
   copying the second index in an index partition on the magnetic tape; and
   satisfying the unmount command.

6. The tape drive-implemented method of claim 3, comprising:
in response to experiencing a disaster situation, using the second index in the ABF wrap to restore a file system of the data written in the data partition.

7. The tape drive-implemented method of claim 3, comprising:
in response to receiving an unmount command before appending the second empty index to the end of the data written in the data partition after the first empty index, generating the second index;
appending the second index to the end of the data written in the data partition after the first empty index;
invalidating the first index in the ABF wrap;
copying the second index in the index partition; and
satisfying the unmount command.

8. The tape drive-implemented method of claim 1, wherein the ABF wrap and the data partition are different data partitions in a same data band on the magnetic tape, wherein the ABF wrap is eventually used as a data partition to store data.

9. A computer program product comprising a computer readable storage medium having program instructions embodied therewith, the program instructions readable and/or executable by a processor to cause the processor to:
in response to detecting a first lapse of a predetermined amount of time, adjust, by the processor, a position of a tape head in a tape drive relative to a magnetic tape such that the tape head is positioned at an accumulating backhitchless flush (ABF) wrap on the magnetic tape;
write, by the processor, a first index in the ABF wrap, wherein the first index corresponds to data written in a data partition on the magnetic tape, wherein the ABF wrap and the data partition are different partitions;
in response to writing the first index in the ABF wrap, adjust, by the processor, the position of the tape head relative to the magnetic tape such that the tape head is positioned at the data partition; and
append, by the processor, a first empty index to an end of the data written in the data partition, wherein a size of the first empty index is less than a size of the first index.

10. The computer program product of claim 9, wherein the first empty index includes:
a first beginning file mark;
a first closing file mark; and
a first end of record sandwiched between the first beginning file mark and the first closing file mark,
wherein the first end of record corresponds to the first index in the ABF wrap.

11. The computer program product of claim 9, the program instructions readable and/or executable by the processor to cause the processor to:
detect, by the processor, a second lapse of the predetermined amount of time;
in response to detecting the second lapse, adjust, by the processor, the position of the tape head relative to the magnetic tape such that the tape head is positioned at the ABF wrap on the magnetic tape;
write, by the processor, a second index in the ABF wrap, wherein the second index corresponds to data written in the data partition after the first empty index;
invalidate, by the processor, the first index in the ABF wrap;
in response to writing the second index in the ABF wrap, adjust, by the processor, the position of the tape head relative to the magnetic tape such that the tape head is positioned at the data partition; and
append, by the processor, a second empty index to an end of the data written in the data partition after the first empty index, wherein a size of the second empty index is less than a size of the second index.

12. The computer program product of claim 11, wherein the second empty index includes:
a second beginning file mark;
a second closing file mark; and
a second end of record sandwiched between the second beginning file mark and the second closing file mark,
wherein the second end of record corresponds to the second index in the ABF wrap.

13. The computer program product of claim 11, the program instructions readable and/or executable by the processor to cause the processor to:
in response to receiving an unmount command, read, by the processor, the second index from the ABF wrap;
use, by the processor, the second index to overwrite the second empty index;
invalidate, by the processor, the second index in the ABF wrap;
copy, by the processor, the second index in an index partition on the magnetic tape; and
satisfy, by the processor, the unmount command.

14. The computer program product of claim 11, the program instructions readable and/or executable by the processor to cause the processor to:
in response to experiencing a disaster situation, use, by the processor, the second index in the ABF wrap to restore a file system of the data written in the data partition.

15. The computer program product of claim 11, the program instructions readable and/or executable by the processor to cause the processor to:
in response to receiving an unmount command before appending the second empty index to the end of the data written in the data partition after the first empty index, generate, by the processor, the second index;
append, by the processor, the second index to the end of the data written in the data partition after the first empty index;
invalidate, by the processor, the first index in the ABF wrap;
copy, by the processor, the second index in the index partition; and
satisfy, by the processor, the unmount command.

16. The computer program product of claim 9, wherein the ABF wrap and the data partition are different data partitions in a same data band on the magnetic tape, wherein the ABF wrap is eventually used as a data partition to store data.

17. A system, comprising:
a tape drive;
a processor; and
logic integrated with the processor, executable by the processor, or integrated with and executable by the processor, the logic being configured to:
in response to detecting a first lapse of a predetermined amount of time, adjust, by the processor, a position of a tape head in a tape drive relative to a magnetic tape such that the tape head is positioned at an accumulating backhitchless flush (ABF) wrap on the magnetic tape;
write, by the processor, a first index in the ABF wrap, wherein the first index corresponds to data written in a data partition on the magnetic tape, wherein the ABF wrap and the data partition are different partitions;

in response to writing the first index in the ABF wrap, adjust, by the processor, the position of the tape head relative to the magnetic tape such that the tape head is positioned at the data partition; and append, by the processor, a first empty index to an end of the data written in the data partition, wherein a size of the first empty index is less than a size of the first index.

18. The system of claim 17, the logic being configured to:

detecting, by the processor, a second lapse of the predetermined amount of time;

in response to detecting the second lapse, adjust, by the processor, the position of the tape head relative to the magnetic tape such that the tape head is positioned at the ABF wrap on the magnetic tape;

write, by the processor, a second index in the ABF wrap, wherein the second index corresponds to data written in the data partition after the first empty index;

invalidate, by the processor, the first index in the ABF wrap;

in response to writing the second index in the ABF wrap, adjust, by the processor, the position of the tape head relative to the magnetic tape such that the tape head is positioned at the data partition; and append, by the processor, a second empty index to an end of the data written in the data partition after the first empty index, wherein a size of the second empty index is less than a size of the second index.

19. The system of claim 18, the logic being configured to:

in response to receiving an unmount command, read, by the processor, the second index from the ABF wrap;

use, by the processor, the second index to overwrite the second empty index;

invalidate, by the processor, the second index in the ABF wrap;

copy, by the processor, the second index in an index partition on the magnetic tape; and satisfy, by the processor, the unmount command.

20. The system of claim 18, the logic being configured to:

in response to receiving an unmount command before appending the second empty index to the end of the data written in the data partition after the first empty index, generate, by the processor, the second index;

append, by the processor, the second index to the end of the data written in the data partition after the first empty index;

invalidate, by the processor, the first index in the ABF wrap;

copy, by the processor, the second index in the index partition; and satisfy, by the processor, the unmount command.

* * * * *